(12) United States Patent
Bickford et al.

(10) Patent No.: US 8,719,763 B1
(45) Date of Patent: May 6, 2014

(54) FREQUENCY SELECTION WITH SELECTIVE VOLTAGE BINNING

(71) Applicant: International Business Machines Corporation, Armonk, NY (US)

(72) Inventors: Jeanne P. Bickford, Essex Junction, VT (US); Eric A. Foreman, Fairfax, VT (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/733,960

(22) Filed: Jan. 4, 2013

(51) Int. Cl.
 *G06F 17/50* (2006.01)
 *G06F 9/455* (2006.01)
 *G06F 11/22* (2006.01)

(52) U.S. Cl.
 USPC ............ 716/136; 716/134; 716/132; 716/113

(58) Field of Classification Search
 USPC .................................. 716/136, 134, 132, 113
 See application file for complete search history.

(56) References Cited

U.S. PATENT DOCUMENTS

| | | | |
|---|---|---|---|
| 7,260,754 B2 | 8/2007 | Lee | |
| 7,340,710 B1 | 3/2008 | Hoerold et al. | |
| 7,475,366 B2 | 1/2009 | Kuemerle et al. | |
| 7,873,925 B2 * | 1/2011 | Visweswariah et al. | 716/136 |
| 8,099,692 B1 | 1/2012 | Kretchmer et al. | |
| 2007/0255516 A1 | 11/2007 | Patel et al. | |
| 2008/0034337 A1 | 2/2008 | Kuemerle et al. | |
| 2009/0217221 A1 | 8/2009 | Anemikos et al. | |
| 2010/0293512 A1 * | 11/2010 | Buck et al. | 716/2 |
| 2011/0035714 A1 * | 2/2011 | Foreman et al. | 716/108 |
| 2012/0010837 A1 * | 1/2012 | Habitz et al. | 702/79 |
| 2013/0014075 A1 * | 1/2013 | Habitz et al. | 716/136 |
| 2013/0061191 A1 * | 3/2013 | Boehm | 716/113 |
| 2013/0113514 A1 * | 5/2013 | Anemikos et al. | 326/16 |
| 2013/0124133 A1 * | 5/2013 | Anemikos et al. | 702/120 |
| 2013/0145333 A1 * | 6/2013 | Buck et al. | 716/113 |

FOREIGN PATENT DOCUMENTS

| | | |
|---|---|---|
| KR | 102004063428 A | 7/2004 |
| WO | 9959207 A1 | 11/1999 |
| WO | 2008066548 A1 | 6/2008 |

OTHER PUBLICATIONS

Aseem et al., "Circuit Optimization Using Statistical Static Timing Analysis", AC 2005, Jun. 13-17, 2005, pp. 321-324.

Zeng et al., "On Correlating Structural Tests with Functional Tests for Speed Binnign of High Performance Design", Proceedings—International Workshop on Microprocessor Test and Verification, 2004, p. 103-109.

Zeng, et al., "On Correlation Structural Tests with Functional Tests for Speed Binning of High Performance Design", Proceedings—International Test Conference, 2004, p. 31-37.

Paul et al., "Low-Overhead Fmax Calibration at Multiple Operating Points Using Delay-Sensativity-Based Path Selection", ACM Transactions on Design Automation of Electronic Systems, v 15, n 2, Feb. 1, 2010.

* cited by examiner

*Primary Examiner* — Thuan Do
*Assistant Examiner* — Magid Dimyan
(74) *Attorney, Agent, or Firm* — Richard Kotulak; Roberts Mlotkowski Safran & Cole, P.C.

(57) ABSTRACT

Approaches for binning integrated circuits using timing are provided. A method includes performing a statistical timing analysis of a design. The method also includes identifying bin sub-spaces within a process space of the design. The method further includes determining a frequency limit for each said bin sub-space. The method additionally includes closing timing to the frequency limit for each said bin sub-space.

20 Claims, 6 Drawing Sheets

US 8,719,763 B1

FREQUENCY SELECTION WITH SELECTIVE VOLTAGE BINNING

FIELD OF THE INVENTION

The invention relates to selective voltage binning of integrated circuits and, more particularly, to optimizing frequency in a selective voltage binning process.

BACKGROUND

The selective voltage binning (SVB) methodology provides a mechanism for reducing the maximum power on an chip by reducing the voltage on the parts that are faster than nominal, while running the slower than nominal parts at the full voltage. Post-manufacturing selective voltage binning is a technique that is used to sort manufactured chips into bins based on whether they were fabricated at either the "slow" end or the "fast" end of a process distribution and to vary the voltage requirements for the chips depending upon the bins they are assigned to in order to reduce maximum chip power. Specifically, with slower process chips it takes more voltage to turn on a transistor and less current is produced to drive the load. Thus, in the past the worst case process ranges drove the required voltage for ultimately running the chip. However, with selective voltage binning, every chip is tested to measure operating speed relative to a nominal speed, and the chips are sorted into bins accordingly. For example, in a process-voltage-temperature space, the temperature and voltage of the chip may be fixed and the operating speed of the chip may be measured. If the operating speed of a particular device is faster than a nominal speed, then the device is placed in a fast device voltage bin. If the operating speed is slower than the nominal speed, then the device is placed in a slow device voltage bin.

After the chips are sorted into bins, an optimal supply voltage (Vdd) for operating the chips in each bin is determined. Since both dynamic power consumption and static power consumption are exponentially proportional to the Vdd, a reduction in the required Vdd will reduce both dynamic and leakage power consumption and, thus, overall power consumption. When a particular chip is provided to a customer, it is provided along with information indicating one or both of its assigned voltage bin and the required supply voltage corresponding to its assigned voltage bin. For example, the assigned bin or supply voltage requirements may be recorded within or on a chip (e.g., by using a printed barcode or embedded non-volatile memory devices) for reference by a customer when setting up power supplies in a system using a particular chip.

Selective voltage binning is thus used for minimizing power consumption and optimizing voltage across the process space, while assuming a constant frequency throughout chip design and timing closure. However, many designs can run at faster frequencies depending on where they sit within the process space.

SUMMARY

In a first aspect of the invention, there is a method of binning integrated circuits using timing. The method includes performing a statistical timing analysis of a design. The method also includes identifying bin sub-spaces within a process space of the design. The method further includes determining a frequency limit for each said bin sub-space. The method additionally includes closing timing to the frequency limit for each said bin sub-space. The performing, the determining, and the closing are performed using a computer device.

In another aspect of the invention, there is a system comprising a computer device comprising a processor and a design tool that is structured and arranged to load a netlist and timing models of an integrated circuit design and perform a statistical timing analysis of the design using the netlist and the timing models. The computer device comprising the processor and the design tool is also structured and arranged to: identify bin sub-spaces within a process space of the design; determine a frequency limit for each said bin sub-space; and close timing to the frequency limit for each said bin sub-space.

In another aspect of the invention, there is a computer program product for binning. The computer program product comprises a computer readable storage medium having program code embodied therewith, the program code being readable and/or executable by a processor of a computer device to perform a method. The method comprises: performing, by the processor, a statistical timing analysis of the design using a netlist and timing models of the design; identifying, by the processor, bin sub-spaces within a process space of the design; determining, by the processor, a frequency limit for each said bin sub-space; and closing timing, by the processor, to the frequency limit for each said bin sub-space.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates generally to selective voltage binning with integrated circuits and, more particularly, to optimizing frequency in a selective voltage binning process. According to aspects of the invention, a frequency limit per process bin and voltage used to achieve the frequency are determined during chip design. Timing is then closed to the frequency limit for each specific bin across the entire design using the voltage assumptions for each bin. Timing can be closed, for example, using multiple clock definitions with designer asserted clock exclusion definitions at test point and/or with a canonical clock projected to the bin subspace. After a chip is manufactured, a frequency regulator circuit reads the electronic chip identification (ECID) on the chip and sets a maximum frequency for the bin when applying the identified voltage for the bin. In this manner, implementations of the invention provide for determining a maximum frequency for a chip in a particular bin while running at the SVB voltage for that bin.

Figure 1:
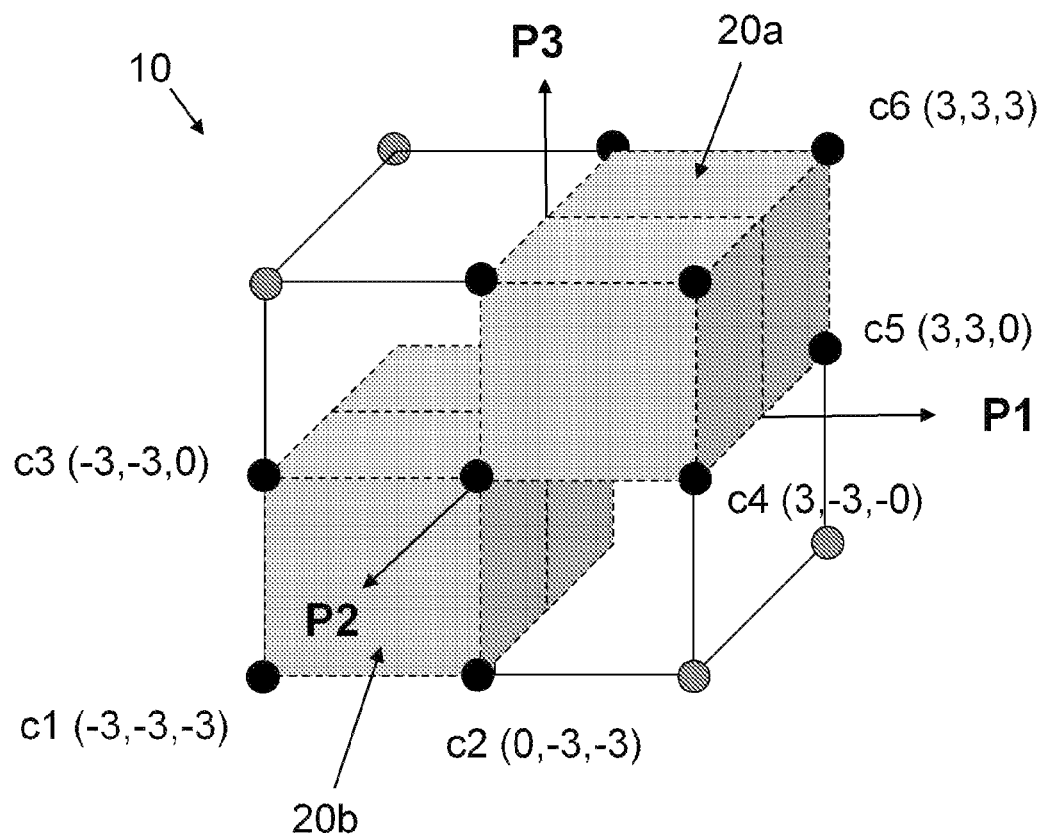
FIG. 1 depicts a process of closing timing only on certain regions of a process space.

FIG. 1 depicts a process of closing timing only on certain regions of a process space. A multiple-dimension process space is represented by the large cube 10 and is defined in terms of process parameters P1, P2, P3, which may be any three sources of statistical variation (e.g., process, temperature, voltage, etc.). Multiple corners projection may be used to break the entire process space 10 into subspaces 20a, 20b. For example, subspace 20a may correspond to fast process/low voltage, and subspace 20b may correspond to slow process/high voltage. In selective voltage binning, each bin may be specified as a subspace (e.g., 20a, 20b, etc.) within the process space (e.g., 10).

Figure 2:
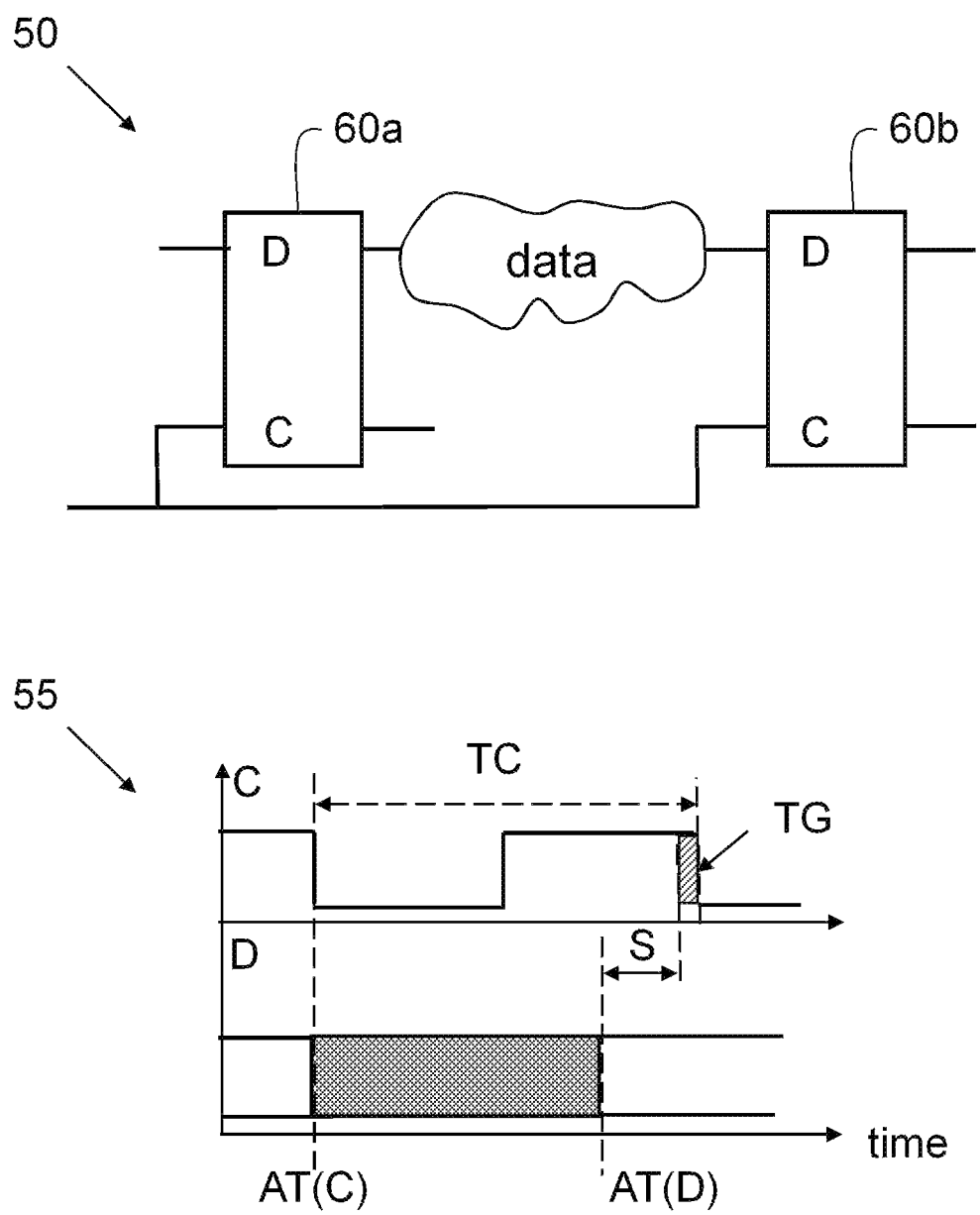
FIG. 2 shows a block diagram and associated timing diagram in accordance with aspects of the invention.

FIG. 2 shows a block diagram 50 and associated timing diagram 55 in accordance with aspects of the invention. The block diagram 50 depicts testing the timing of capturing a data signal between two latches 60a, 60b. In FIG. 2, the data signal is represented by reference character "D" and the clock signal is represented by reference character "C". Reference character "TC" represents clock cycle (e.g., clock period) and reference character "TG" represents library characterized setup margin that may be characterized within a latch. "S" represents the setup slack, "AT(C)" represents the arrival time of the clock signal, and "AT(D)" represents the arrival time of the data. Based on these representations, the slack may be expressed as shown in Equation 1:

$$S = AT(C) + TC - AT(D) - TG \quad (1)$$

The expression of Equation 1 may be rearranged to solve for the clock cycle as shown in Equation 2:

$$TC = AT(D) - AT(C) + TG + S \quad (2)$$

In order to avoid negative slack (e.g., to impose only zero or positive slack), the value of S may be set equal to zero, in which case Equation 2 simplifies to Equation 3:

$$TC = AT(D) - AT(C) + TG \quad (3)$$

From statistical timing, all timing quantities in Equation 3 may be expressed in canonical form (e.g., as a vector of timing quantities that represent a distribution), and the canonical form of the clock cycle TC is shown in Equation 4:

$$TC = t_0 + \sum_{i=1}^{n} a_i \Delta X_i + r \Delta R \quad (4)$$

where:
$t_0$ is a mean value of a parameter (e.g., clock cycle);
$a_i$ is a sensitivity of the parameter;
$\Delta X_i$ is a width of a distribution for the parameter;
r is a random variation factor; and
$\Delta R$ is a distribution of the random variation.

A timing test is satisfied for the clock cycle TC when T>TC. According to aspects of the invention, the canonical clock is projected to the bin parameter space and timing is closed to the frequency targets. For example, a TC value may be determined for a design corresponding to a bin, and timing tests may be run using the chip design and the assigned bin voltage to determine the smallest T that is greater than TC for the bin. Since the clock cycle (e.g., period) is the inverse of frequency, the determined smallest T for the bin may be used to determine the highest frequency that meets (e.g., closes) timing for the bin at the bin voltage.

Multiple clocks are used in the timing analysis which represents different frequencies at which the chip may be run. For example, a first clock is asserted at a specific frequency (e.g., clock1 at 1 GHz). Clock1 will have a "phase" (e.g., a unique tag name in the timing graph) which propagates through all logic gates. Tests between data and clock1 occur at a test point (e.g., latches/flip-flops 60a, 60b, etc.). A second, separate clock is be asserted (e.g., clock2) to determine how timing would work with a different clock, e.g., a 1.5 GHz. Clock2 is propagated through all the logic in the same manner as was clock1. There are thus two separate phase tags (i.e., clock1 and clock2) in the timing graph. At a test point the design tool will check clock1 against clock2 as it is looking for all possible conditions. However, since two actual clocks are not going to be physically on the chip at the same time, the testing of clock 1 against clock 2 is unnecessary and wastes computational memory and/or runtime. To address this issue, a designer defined clock exclusion command may be asserted that says excludes clock1 from being tested against clock2. In this manner, as many clocks as desired may be created and used to determine which frequency works best with the design. A cost of creating and testing multiple clocks, however, is realized in complexity in assertions and significant overhead in computational memory/runtime (e.g., each new clock phase causes duplication of the timing graph). The canonical clock utilized in aspects of the invention permits the use of a single asserted clock for determining which frequency allows timing to have zero slack, and thus reduces computational expenditures compared to the multiple clock approach.

Figure 3:
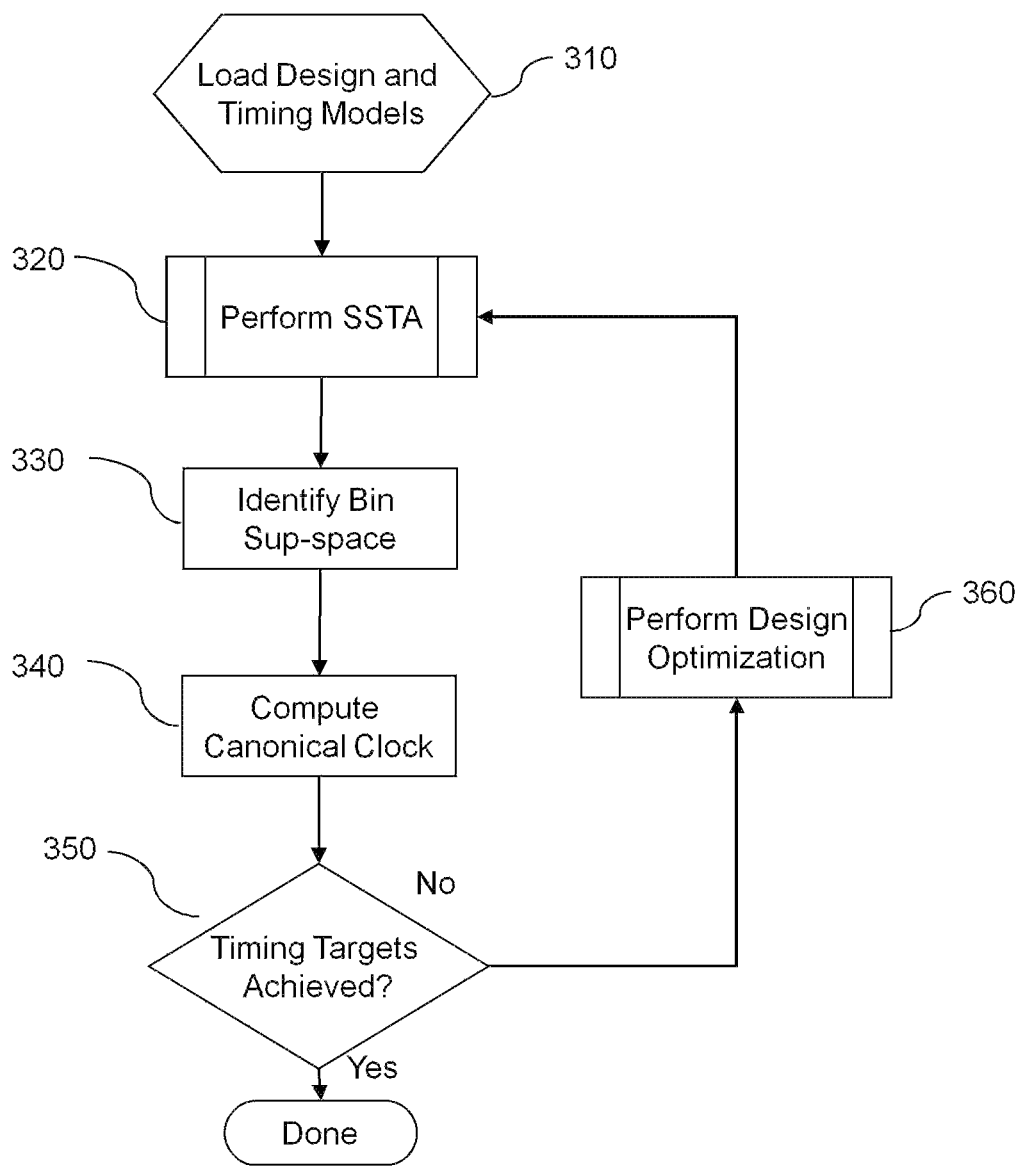
FIGS. 3-5 show flowcharts of processes in accordance with aspects of the invention.
Figure 4:
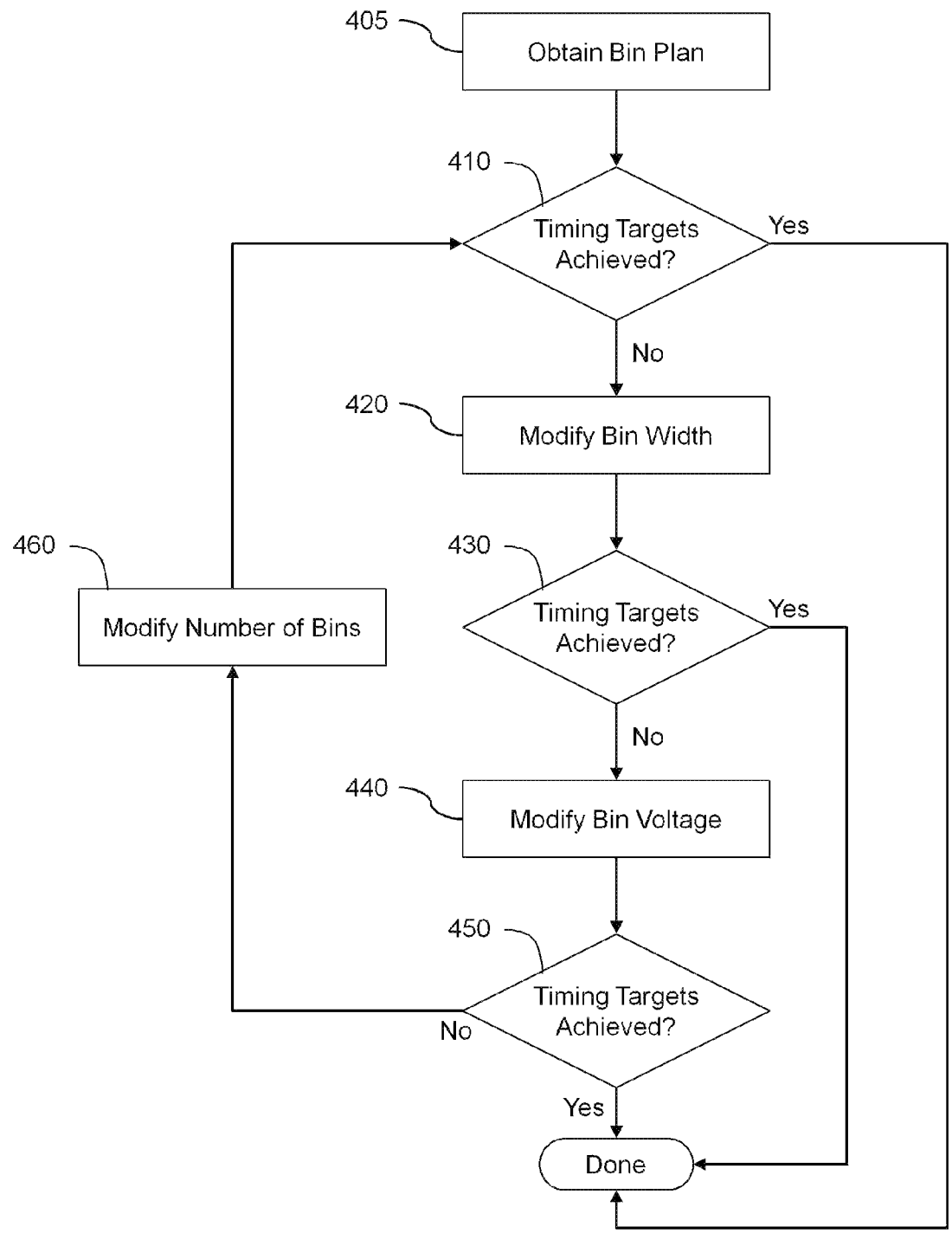
Figure 5:
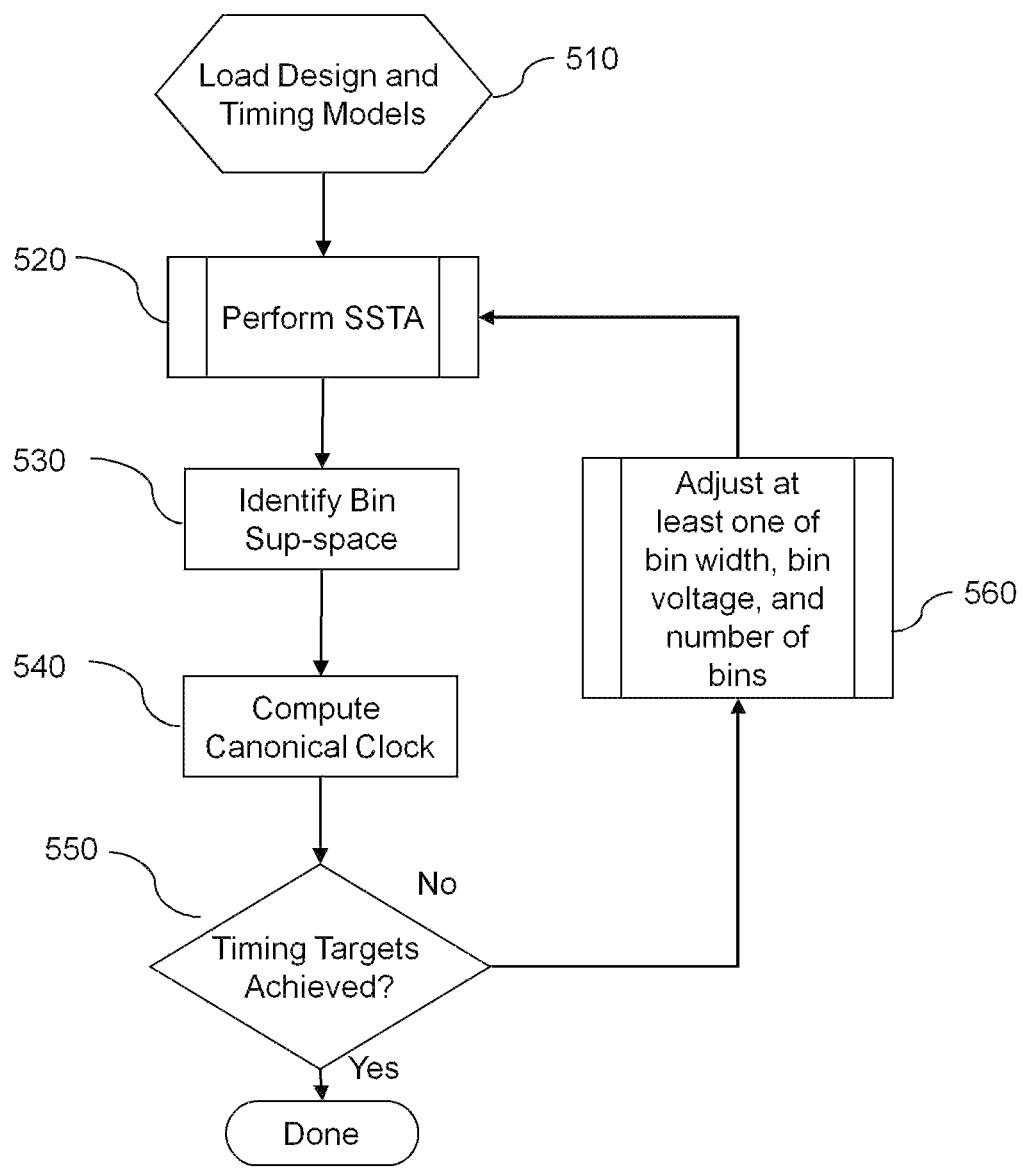

FIGS. 3-5 show exemplary flowcharts and/or block diagrams for performing aspects of the present invention. The steps of FIGS. 3-5 may be implemented, for example, in the environment of FIG. 6, which is described in greater detail herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 6. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flow for a process in accordance with aspects of the present invention. At step 310, a computer-based design tool loads design and timing models of an integrated circuit design. The computer-based design tool may be implemented in the environment of FIG. 6, for example, and may comprise a combination of hardware and special-purpose software that is configured to perform the functions described herein. The design and timing models include design data such as, but not limited to: circuit netlist for the design, delay models for the netlist, timing constraints, design voltage range (e.g., 500 mV to 1000 mV), etc.

At step 320, a statistical static timing analysis (SSTA) of the design (e.g., the design loaded at step 310) is performed using the design tool. In embodiments, the SSTA propagates the timing based on the design and is performed using design data from step 310 and the canonical form (e.g., as described in FIG. 2).

At step 330, the bin sub-space is defined. In embodiments, the number of bins (e.g., normally defined by a customer) and the design voltage range (e.g., from step 310) are used in conjunction with the SSTA results to define the width (e.g., sigma (σ) range, cut points, etc.) and bin voltage range associated with each bin. Step 330 may be performed in an automated manner using the design tool.

At step 340, the design tool computes the canonical clock (e.g., TC in Equation 4) for each bin (e.g., to each bin sub-space) using the bin voltage range for each particular bin (e.g., as defined at step 330) and the appropriate design data (e.g., from step 310).

At step 350, the design tool determines whether the timing targets for the design are achieved. In embodiments, the canonical clock determined at step 340 is used to close timing to a frequency limit per bin, e.g., to determine a highest frequency (i.e., a smallest clock cycle TC) for each bin at the voltage associated with the bin. Step 350 may further include comparing the determined frequency limits for the bins to timing targets, which are normally defined by the customer. The design is considered complete and the process ends when timing is closed and the timing targets are achieved. On the other hand, when timing cannot be closed and/or the timing targets are not achieved, then the process goes to step 360 where the design tool performs design optimization. The design optimization at step 360 may include conventional timing optimization (e.g., changing the netlist, such as moving wires, adding buffers, etc.) to achieve timing closure. After step 360, the process returns to step 320 to perform the SSTA with the new/modified netlist generated at step 360.

The timing optimization as described herein may utilize a standard optimization tool with slack as the metric used for timing closure. In accordance with aspects of the invention, the determined slack may be converted to clock cycle for comparison to the frequency targets. Implementations of the invention may also be used to make additional changes to the voltage range of each bin, the number of bins used, and the width of each bin. For example, the number of bins and the width of each bin in an SVB scheme for a chip design are normally pre-defined, e.g., by the design specification or the customer. Moreover, all the bins in an SVB scheme for a chip design normally have substantially the same width, e.g., the process space distribution (e.g., from −3σ to +3σ) is divided equally among the number of bins. Furthermore, the bin voltage range for each bin in an SVB scheme for a chip design is normally based solely on the width of each bin and the design voltage range, e.g., by dividing the design voltage range among the bins in direct correspondence with the in bin widths. Implementations of the invention provide a method for varying at least one of the number of bins, the bin width, and the bin voltage from such pre-specified values in order to further optimize the design.

FIG. 4 depicts an exemplary flow for a process of optimizing at least one of the number of bins, bin width, and bin voltage in accordance with aspects of the present invention. At step 405, the design tool obtains the bin plan, which includes the number of bins, the width of each bin (e.g., as defined by cut points in the process distribution), and the bin voltage (e.g., the portion of the design voltage assigned to each bin).

At step 410, the design tool determines whether the timing targets are achieved with the bin plan obtained at step 410. For example, step 410 may include performing a timing analysis of the design as divided by the bin plan to determine whether the design and bin plan meet the timing targets, e.g., specified by the customer. If the timing targets are achieved at step 410, then the design and bin plan are acceptable and the process ends. On the other hand, if the timing targets at not met, then the process goes to step 420 where the bin plan is modified by adjusting the width of one or more bins. In embodiments, the design tool modifies the bin width by adjusting the cut points of the bins along the process distribution. For example, bin #1 may originally be defined by a first cut point of −2σ and a second cut point of −1σ. Step 430 may involve changing one or more of these cut points, e.g., to −2.25σ and −1.25σ, respectively. Similar changes may be made to other ones of the bins. The change in cut points applied to each bin may be based on an optimization algorithm or other logic programmed in the design tool.

At step 430, the design tool determines whether the timing targets are achieved with the bin plan as modified at step 420. Step 430 may be performed in a manner similar to step 410. If the timing targets are achieved at step 430, then the design and bin plan (e.g., the bin plan as modified at step 420) are acceptable and the process ends. On the other hand, if the timing targets at not met, then the process goes to step 440 where the design tool further modifies the bin plan by adjusting the voltage of one or more of the bins. For example, each bin may have a range defined by a low voltage and a high voltage, and the design tool may modify (e.g., change the value) of one or both of the low voltage and high voltage for one or more of the bins. The change in voltage applied to each bin may be based on an optimization algorithm or other logic programmed in the design tool.

At step 450, the design tool determines whether the timing targets are achieved with the bin plan as modified at step 440. Step 450 may be performed in a manner similar to step 410. If the timing targets are achieved at step 450, then the design and bin plan (e.g., the bin plan as modified at step 440) are acceptable and the process ends. On the other hand, if the timing targets at not met, then the process goes to step 460 where the design tool further modifies the bin plan by adjusting the number of bins. For example, the bin plan may originally have sixteen bins, and step 460 may change the number of bins to fifteen. Step 460 also involves changing the bin widths and voltages to correspond to the new number of bins. The change in number of bins may be based on an optimization algorithm or other logic programmed in the design tool. After changing the number if bins, the process returns to step 410 for comparison to the timing targets with the modified bin plan.

The process described in FIG. 4 may be used in embodiments to achieve timing targets by changing aspects of the bin plan without making design changes, e.g., without making changes to the netlist, etc. In this manner, an initial SVB bin plan may be optimized to achieve timing targets without the incurring the expenditure involved in changing the design.

FIG. 5 shows a flowchart of another process according to aspects of the invention. The process of FIG. 5 combines aspects of the processes of FIGS. 3 and 4, and includes steps 510, 520, 530, 540, and 550 which are the same as steps 310, 320, 330, 340, and 350, respectively, as described with respect to FIG. 3. Unlike FIG. 3, however, when timing targets are not achieved at step 550, the process of FIG. 5 proceeds to step 560 in which the bin plan is modified by adjusting at least one of the bin widths, bin voltages, and number of bins (e.g., instead of modifying the design). Step 560 may be performed in a manner similar to at least one of steps 420, 440, and 460 described with respect to FIG. 4. After modifying the bin plan at step 560, the process returns to step 520.

Figure 6:
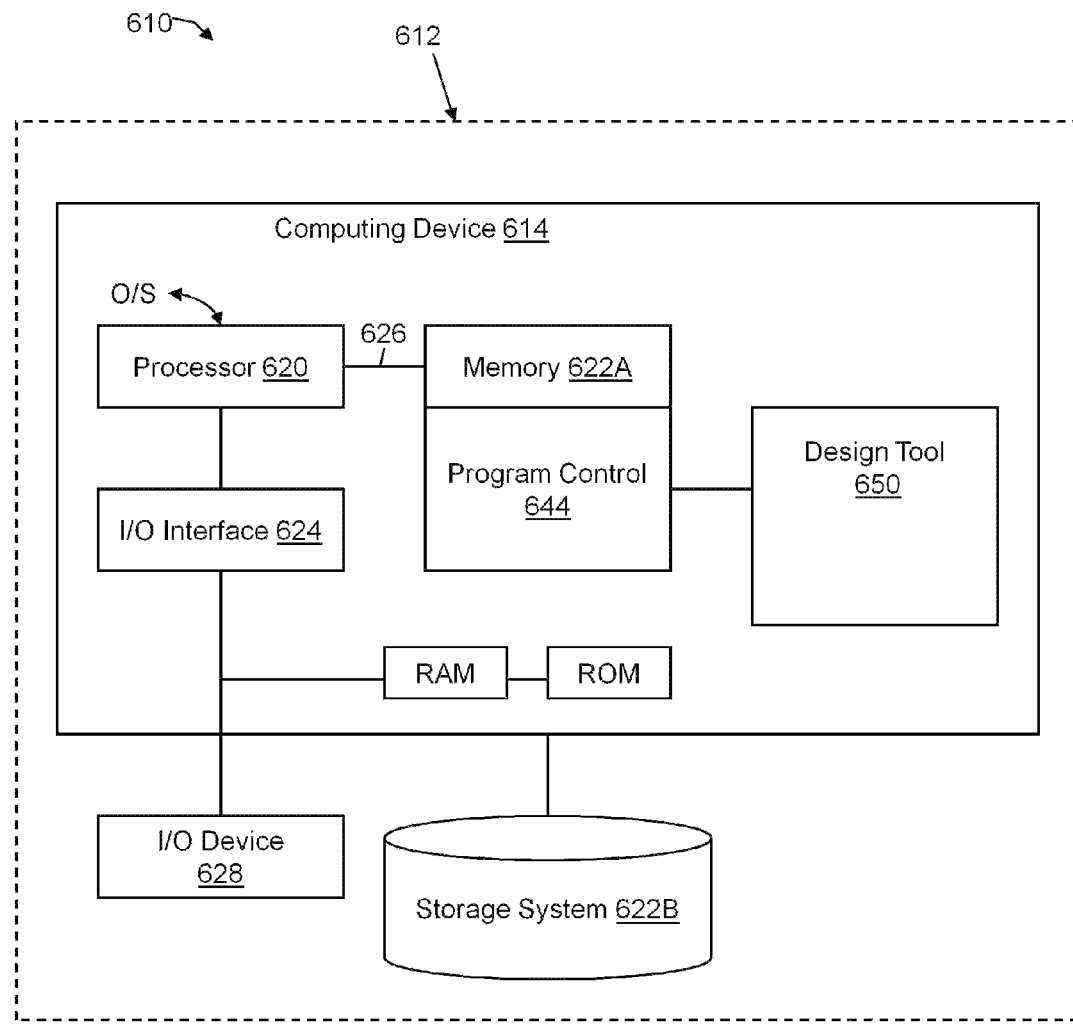
FIG. 6 shows an illustrative environment for performing the processes in accordance with the invention.

FIG. 6 shows an illustrative environment 610 for managing the processes in accordance with the invention. As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Still referring to FIG. 6, the environment 610 includes a server or other computing system 612 that can perform the processes described herein. In particular, the system 612 includes a computing device 614. The computing device 614 can be resident on a network infrastructure or computing device of a third party service provider (any of which is generally represented in FIG. 6).

The computing device 614 also includes a processor 620, memory 622A, an I/O interface 624, and a bus 626. The memory 622A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 614 is in communication with the external I/O device/resource 628 and the storage system 622B. For example, the I/O device 628 can comprise any device that enables an individual to interact with the computing device 614 (e.g., user interface) or any device that enables the computing device 614 to communicate with one or more other computing devices using any type of communications link. The external I/O device/resource 628 may be for example, a handheld device, PDA, handset, keyboard etc.

In general, the processor 620 executes computer program code (e.g., program control 644), which can be stored in the memory 622A and/or storage system 622B. Moreover, in accordance with aspects of the invention, the program control 644 controls a design tool 650, e.g., that performs one or more of the processes described herein. The design tool 650 can be implemented as one or more program code in the program control 44 stored in memory 622A as separate or combined modules. Additionally, the design tool 650 may be implemented as separate dedicated processors or a single or several processors to provide the function of these tools. While executing the computer program code, the processor 620 can read and/or write data to/from memory 622A, storage system 622B, and/or I/O interface 624. The program code executes the processes of the invention. The bus 626 provides a communications link between each of the components in the computing device 614.

The computing device 614 can comprise any general purpose computing article of manufacture capable of executing computer program code installed thereon (e.g., a personal computer, server, etc.). However, it is understood that the computing device 614 is only representative of various possible equivalent-computing devices that may perform the processes described herein. To this extent, in embodiments, the functionality provided by the computing device 614 can be implemented by a computing article of manufacture that includes any combination of general and/or specific purpose hardware and/or computer program code. In each embodiment, the program code and hardware can be created using standard programming and engineering techniques, respectively.

Similarly, the system 612 is only illustrative of various types of computer infrastructures for implementing the invention. For example, in embodiments, the system 612 comprises two or more computing devices (e.g., a server cluster) that communicate over any type of communications link, such as a network, a shared memory, or the like, to perform the process described herein. Further, while performing the processes described herein, one or more computing devices on the system 612 can communicate with one or more other computing devices external to the system 612 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method of binning integrated circuits using timing, comprising:
    performing a statistical timing analysis of a design;
    identifying bin sub-spaces within a process space of the design;
    determining a frequency limit for each said bin sub-space;
    closing timing to the frequency limit for each said bin sub-space, wherein the performing, the determining, and the closing are performed using a computer device;
    manufacturing a chip of the design;
    associating the chip with one of the bin sub-spaces; and
    providing the chip with an electronic chip identification (ECID) that indicates a the frequency limit of the one of the bin sub-spaces and a voltage of the one of the bin sub-spaces.

2. The method of claim 1, wherein the determining the frequency limit is performed using a canonical clock.

3. The method of claim 1, wherein the determining the frequency limit is performed using designer asserted clock exclusions at test points.

4. The method of claim 1, further comprising determining whether timing targets are achieved.

5. The method of claim 1, further comprising:
    determining that timing targets are not achieved; and
    performing design optimization by adjusting the design based on the determining that timing targets are not achieved.

6. The method of claim 1, further comprising:
    determining that timing targets are not achieved; and
    adjusting a bin plan based on the determining that timing targets are not achieved.

7. The method of claim 6, wherein the adjusting the bin plan comprises adjusting at least one of: bin width, bin voltage, and number of bins.

8. The method of claim 1, wherein the determining the frequency limit for each said bin sub-space comprises determining a maximum frequency for a chip in a particular one of said bin sub-spaces while running at a bin voltage range associated with said bin sub-space.

9. A system, comprising:
    a computer device comprising a processor and a design tool that is structured and arranged to:
    load a netlist and timing models of an integrated circuit design;
    perform a statistical timing analysis of the design using the netlist and the timing models;
    define bin sub-spaces within a process space of the design, wherein the defining includes defining a bin width and a bin voltage range associated with each one of the bin sub-spaces;
    determine a canonical clock for each one of the bin sub-spaces;

determine, using the canonical clock for each said bin sub-space, a frequency limit for each said bin sub-space at the bin voltage range associated with said bin sub-space; and close timing to the frequency limit for each said bin sub-space.

10. The system of claim 9, wherein the computer device comprising the processor and the design tool is structured and arranged to determine whether timing targets are achieved.

11. The system of claim 9, wherein the computer device comprising the processor and the design tool is structured and arranged to:

determine that timing targets are not achieved; and perform design optimization by adjusting the design based on the determining that timing targets are not achieved.

12. The system of claim 9, wherein the computer device comprising the processor and the design tool is structured and arranged to:

determine that timing targets are not achieved; and adjust a bin plan based on the determining that timing targets are not achieved.

13. The system of claim 12, wherein the adjusting the bin plan comprises adjusting at least one of: bin width, bin voltage, and number of bins.

14. The system of claim 9, wherein the computer device comprising the processor and the design tool is structured and arranged to provide an electronic chip identification (ECID) that indicates the determined frequency limit of one of the bin sub-spaces and a voltage of the one of the bin sub-spaces.

15. A computer program product for binning, the computer program product comprising a computer readable storage medium having program code embodied therewith, the program code being readable and/or executable by a processor of a computer device to perform a method comprising:

performing, by the processor, a statistical timing analysis of the design using a netlist and timing models of the design;

defining, by the processor, bin sub-spaces within a process space of the design, wherein the defining includes defining a bin width and a bin voltage range associated with each one of the bin sub-spaces;

determine a canonical clock for each one of the bin sub-spaces;

determining, by the processor and using the canonical clock for each said bin sub-space, a frequency limit for each said bin sub-space at the bin voltage range associated with said bin sub-space; and closing timing, by the processor, to the frequency limit for each said bin sub-space.

16. The computer program product of claim 15, wherein the method further comprises determining whether timing targets are achieved.

17. The computer program product of claim 15, wherein the method further comprises:

determining that timing targets are not achieved; and performing design optimization by adjusting the design based on the determining that timing targets are not achieved.

18. The computer program product of claim 15, wherein the method further comprises:

determining that timing targets are not achieved; and adjusting a bin plan based on the determining that timing targets are not achieved.

19. The computer program product of claim 18, wherein the adjusting the bin plan comprises adjusting at least one of: bin width, bin voltage, and number of bins.

20. The computer program product of claim 15, wherein the method further comprises providing an electronic chip identification (ECID) that indicates the determined frequency limit of one of the bin sub-spaces and a voltage of the one of the bin sub-spaces.

* * * * *